No. 789,302. PATENTED MAY 9, 1905.
F. L. O. WADSWORTH.
MANUFACTURE OF GLASS ARTICLES.
APPLICATION FILED OCT. 1, 1903.

3 SHEETS—SHEET 1.

WITNESSES

INVENTOR
F. L. O. Wadsworth
by Bakewell & Byrnes
his Attorneys

No. 789,302. PATENTED MAY 9, 1905.
F. L. O. WADSWORTH.
MANUFACTURE OF GLASS ARTICLES.
APPLICATION FILED OCT. 1, 1903.

3 SHEETS—SHEET 2.

WITNESSES

INVENTOR
F. L. O. Wadsworth
by Bakewell & Byrnes
his Attorneys

No. 789,302.

Patented May 9, 1905.

UNITED STATES PATENT OFFICE.

FRANK L. O. WADSWORTH, OF ALLEGHENY, PENNSYLVANIA, ASSIGNOR TO PRESSED PRISM PLATE GLASS COMPANY, OF NEW YORK, N. Y., A CORPORATION OF WEST VIRGINIA.

MANUFACTURE OF GLASS ARTICLES.

SPECIFICATION forming part of Letters Patent No. 789,302, dated May 9, 1905.

Application filed October 1, 1903. Serial No. 175,297.

*To all whom it may concern:*

Be it known that I, FRANK L. O. WADSWORTH, of Allegheny, Allegheny county, Pennsylvania, have invented a new and useful Improvement in the Manufacture of Glass Articles, of which the following is a full, clear, and exact description, reference being had to the accompanying drawings, forming part of this specification, in which—

Figure 1:
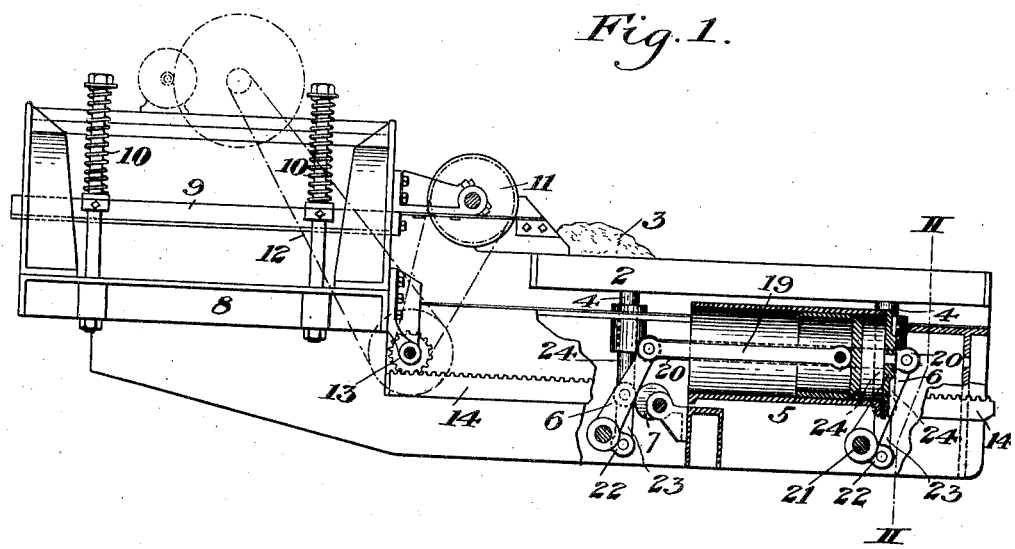
Figure 2:
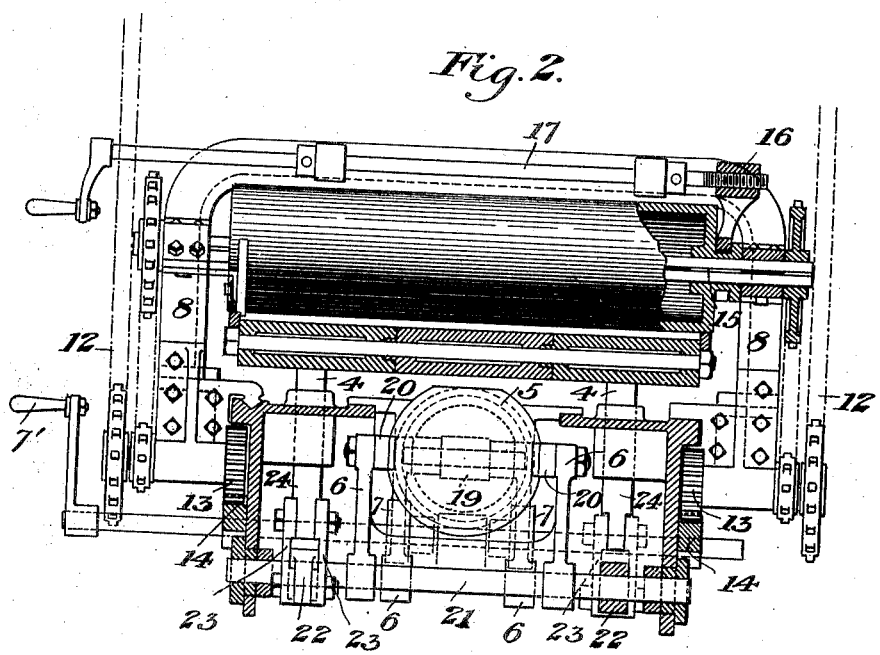
Figure 3:
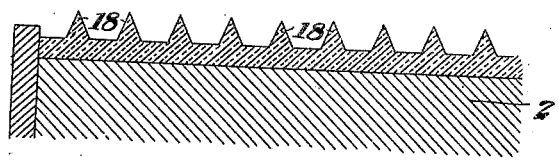
Figure 4:
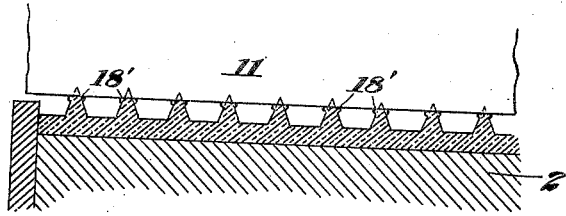
Figure 5:
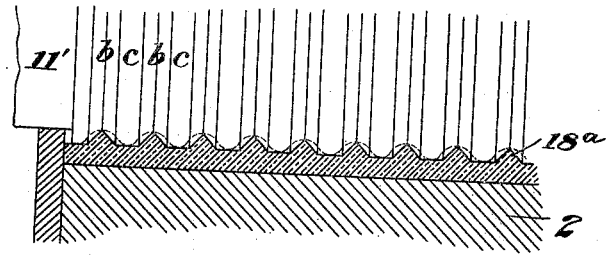
Figure 6:
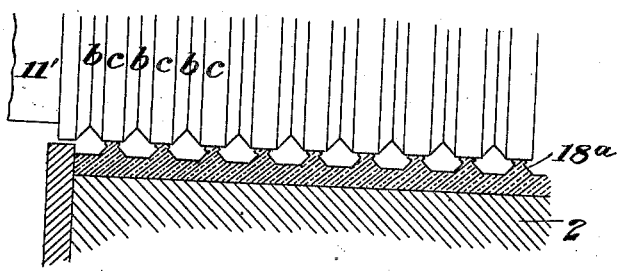
Figure 7:
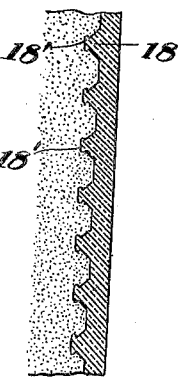
Figure 8:
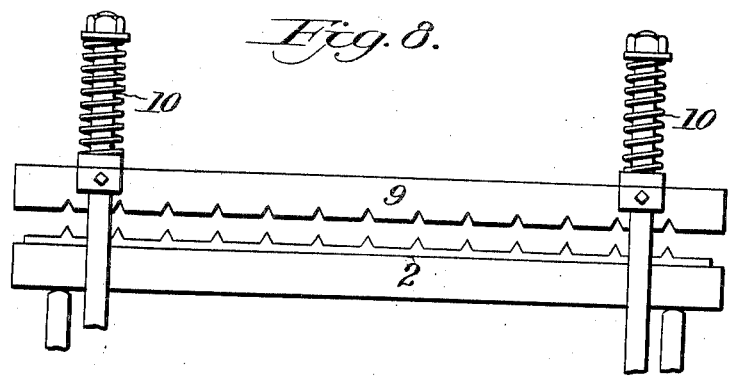
Figure 9:
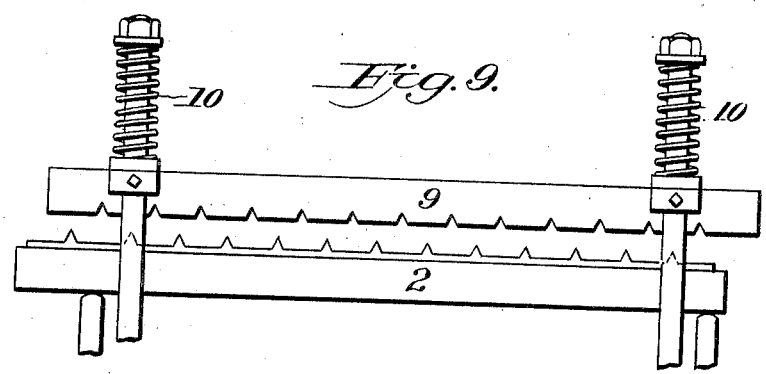
Figure 10:
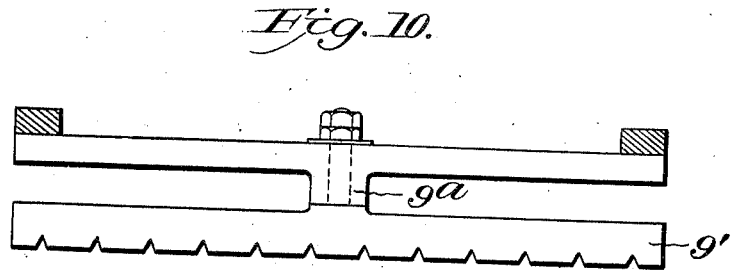

Figure 1 shows, in side elevation, partly in vertical section, a machine adapted for the practice of my invention. Fig. 2 is a vertical cross-section on the line II II of Fig. 1, showing one end of the roll in section. Fig. 3 is a sectional view showing a glass plate with projecting ribs formed thereon by the machine shown in Fig. 1, and Fig. 4 illustrates the subsequent operation in which these ribs are flattened by a roller. Fig. 5 shows a grooved roller which may be employed in the preliminary operation of spreading the sheet preparatory to forming and shaping the projections thereon by pressing; and Fig. 6 illustrates the subsequent operation in which the relative position of the roller and glass plate has been shifted, so as to bring the ribs of the plate opposite to the plain portion of the roller by which these ribs are flattened. Fig. 7 shows in section a glass tile made in accordance with my invention and held in place by cement. Fig. 8 is a detail view showing in section the pressing-die of Fig. 1 in the position which it occupies at the end of the operation of pressing the projections on a sheet which has been spread preliminary by rolling. Fig. 9 shows the said die in the position which it occupies after it has been shifted laterally preparatory to the final operation of remolding the pressed projections. Fig. 10 shows another apparatus for accomplishing the final step of remolding the pressed sheet by turning the pressing-die horizontally, so as to change the portion of the pressing-surface which comes into contact with the pressed figures on the glass.

My invention is primarily designed for the manufacture of glass tiles having ribs or projections formed on the rear surface and flattened or widened at their ends, so as to form keys for holding the tiles to a bed of cement.

My invention in one of its features consists in an operation embodying at least three steps—namely, first, spreading a body of glass into sheet form, then molding the sheet with projections or ribs on its surface, and then flattening the molded projections or ribs.

It also consists in practicing these steps when the relative position of the glass sheet and the molding instrument are changed after the projections or figures have been formed, and the molding-surface is remolded or refigured by bringing different portions of it again into contact with the molding-surface.

By the intermediate step of pressing the projections on the surface of the sheet before flattening or remolding them I am enabled to secure projections which are very sharply defined and may be made narrow, whereas if this step were omitted and it were attempted to employ a two-step operation of rolling the projections and then flattening them the projections would be obtuse and badly defined and generally unfit for the purpose for which they are intended. By first spreading the sheet by rolling I am enabled to make the sheet of any desired size, and this could not be done if the preliminary rolling operation were omitted.

Figs. 1, 2, 3, and 4 illustrate one form of the apparatus for the practice of my invention. In these figures 2 is a table on which the body of plastic glass 3 to be molded is placed. This table is mounted upon standards 4, adapted to be moved vertically, preferably by a cylinder 5, and intermediate connecting mechanism, which consists, preferably, of a pitman 19, connected with the piston and connected by levers 6 and rods 20 to shafts 21 which by levers 22 and links 23 are connected to vertical slides 24, by which the table is guided in its vertical motion. The cylinder is provided with suitable fluid-supply connections, the rise of the table being effected by the admission of fluid and its descent being effected by gravity. The position of the table when at its lowest point is determined by an adjustable stop consisting, preferably, of an eccentric 7, which is adapted to be engaged by and to stop part of the connecting mechanism 6. 8 is a carriage on which a molding-plate 9 is mounted and is preferably backed yieldingly by springs 10, and on the carriage is a roll 11, which may have a plain face and is rotated by suitable power connections 12. The carriage is capable of horizontal motion to bring the roll 11 and plate 9 successively over the table 2, and for this purpose I may employ on the table driven pinions 13, which engage with stationary racks 14.

The roll 11 may be movable lengthwise of its axis for the purpose of adjustment. This is not necessary where the roll is plain, but is employed where it is grooved, as described below. Such adjustment may be effected by mounting the roll slidingly on its shaft with a keyway 15 and providing a nut 16 and screw-shaft 17 for moving it.

The operation is as follows: The table 2 is set in its lowest position permitted by the eccentric 7, which has been adjusted by a handle 7' to secure the desired thickness of glass, the plastic glass is placed thereon, and the carriage 8 is advanced so as to move the roll 11 over the glass and to spread it upon the table into a flat sheet. Further advance of the carriage moves the roll beyond the table and brings over the glass the molding-plate 9, whose under surface is formed with grooves of suitable shape to impress upon the glass the desired ribs or projections. Then by actuating the cylinder 5 the table is raised, and the glass sheet, being pressed thereby against the plate 9, is molded with the projections or ribs 18 shown in Fig. 3. The table is then lowered by reverse operation of the cylinder, and the stop 7 is adjusted so as to permit it to descend farther than the position which it occupied during the operation of the roll. The carriage 8 is then moved in the reverse direction, so as to carry the roll 11 over the molded glass sheet, and as the surface of the roll comes into contact with the edges of the projections 18 it acts thereon at right angles to the surface of the sheet and flattens or expands the projections into the form of keys 18', as shown in Fig. 4. The shaping of the glass sheet is thus completed, and after the necessary annealing and cutting it is ready for use as tiles, as shown in Fig. 7.

In the modified apparatus shown in Figs. 5 and 6 the roll 11' is formed with grooves b, the purpose of which is not to form ribs or projections to final shape, but simply to make prominences on the sheet preliminary to the second step of molding with the die 9. The grooves of the die are brought directly above the prominences, so that the thickened portions of the glass at those places will more readily fill the grooves and enable the die to be made with deeper grooves than would otherwise be practicable. The presence of the prominences also enables the molding operation to be performed with the least possible displacement of the glass in the grooves, and this tends to secure sharper definition of the ribs on the finished sheet and to prevent molecular straining of the glass.

The third operation of flattening the ribs on the glass sheet by means of the grooved roller 5' is accomplished, as illustrated in Fig. 6, by shifting the roller endwise, so as to bring the intermediate plain portions c directly above the projections 18$^a$, and after the die has been retracted passing the roll again over the glass, when the plain portions will act upon the projections and flatten or expand them.

In Figs. 8 and 9 I show my invention modified by the employment of the die for the third step of the method, as well as the second step. In this case after the die has been employed for pressing and molding ribs on the glass sheet it is shifted laterally, so as to bring the ungrooved portions of the die directly above the ribs on the glass, and the glass and die are then brought into molding contact for the purpose of flattening the projections. When this manner of practicing my invention is employed with the apparatus shown in Fig. 1, the grooves on the face of the die 9 should be changed in direction so as to extend transversely to the length of the machine, and the shifting of the die can then be performed by moving the carriage slightly in a longitudinal direction on its track. Where the grooves on the die extend longitudinally in the direction of the traveling motion of the die, means should be provided for shifting the die laterally between the first and second steps of the method.

Instead of shifting the die in right lines, as above described, I may employ the means shown in Fig. 10, in which the die 9' is supported by a swiveled connection 9$^a$, on which it may be turned in a horizontal plane. By thus turning it slightly between the first and second steps of the method the grooves are taken out of register with the molded projections on the glass, and when the glass and die are then brought into molding contact the projections on the sheet will be flattened.

Within the scope of my invention as defined in the claims those skilled in the art will be able to modify in many other ways the means employed for carrying out the process, since

What I claim is—

1. The method of making glass articles which consists in the combination of at least the following three steps, namely; first, spreading the glass into a sheet, then pressing its surface to form projections thereon and then reshaping the surface of the projections; substantially as described.

2. The method of making glass articles which consists in first molding the surface of a glass sheet to a certain configuration by means of pressure, then removing the molding-surface and altering the relative position of sheet and molding-surface, and finally reshaping the molded sheet by bringing it into contact with a different portion of the molding-surface; substantially as described.

In testimony whereof I have hereunto set my hand.

FRANK L. O. WADSWORTH.

Witnesses:
JOHN MILLER,
H. M. CORWIN.